W. HACKETT.
BOLT.
APPLICATION FILED NOV. 27, 1918.
1,310,909.
Patented July 22, 1919.
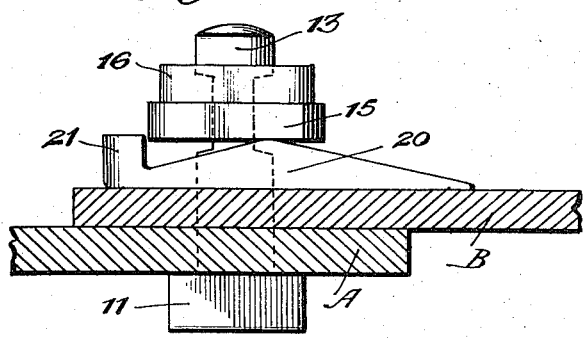
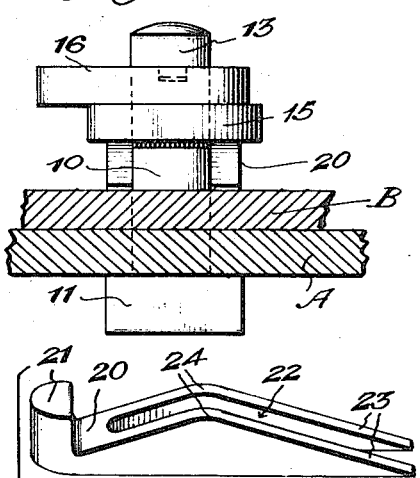
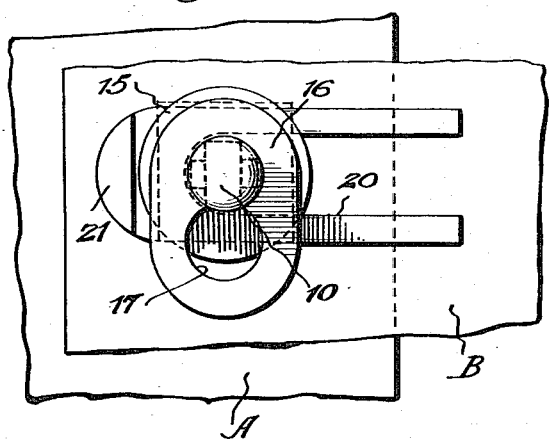
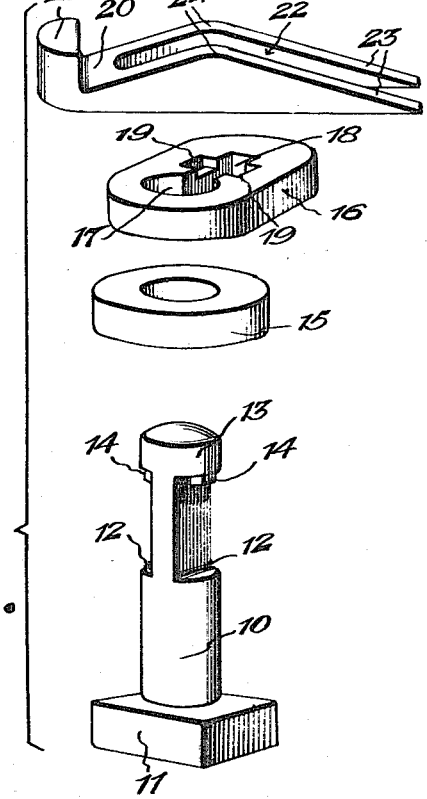
Inventor
William Hackett,
By
Munn & Co.
Attorney

UNITED STATES PATENT OFFICE.

WILLIAM HACKETT, OF PORTLAND, OREGON, ASSIGNOR OF ONE-HALF TO JOHN McPHEE, OF PORTLAND, OREGON.

BOLT.

1,310,909.  Specification of Letters Patent.  Patented July 22, 1919.

Application filed November 27, 1918. Serial No. 264,333.

*To all whom it may concern:*

Be it known that I, WILLIAM HACKETT, a citizen of the United States, and a resident of Portland, county of Multnomah, and State of Oregon, have invented certain new and useful Improvements in Bolts, of which the following is a specification.

My present invention relates generally to bolts, and more particularly to a bolt having a locking means in place of the usual nut, my object being the provision of an arrangement which will do away with nuts, as well as the time and trouble essential to their proper tightening, and a further object is to provide a simple and inexpensive arrangement which will be proof against accidental displacement.

In the accompanying drawing illustrating my invention and forming a part of the specification, Figure 1 is a sectional side view illustrating the practical application of my improved bolt, Fig. 2 is a similar view taken at right angles with respect to Fig. 1, Fig. 3 is a top plan view thereof, Fig. 4 is a perspective view of the several parts of the bolt in detached relation.

Referring now to these figures and particularly to Fig. 4, my invention proposes a bolt, the shank 10 of which has an integral head 11 at one end and has its opposite sides cut away to form recesses 12 adjacent the opposite end thereof, at the outer end of which recesses the plain end 13 of the shank has lugs 14 in diametrically opposed relation.

Over the shank 10 of the bolt constructed as above, one or more washers 15 of suitable thickness is required and as will be presently explained, are to be used, a locking plate 16 being associated with the plain end 13 of the bolt and being secured in connection therewith by virtue of the construction which will now be described.

The locking plate 16 is slightly elongated in one direction and has an opening 17 therethrough of the diameter of the shank 10, with a slot 18 extending from the opening 17 in the direction of the longitudinal axis of the plate, of the width of that portion of the shank 10 between its recesses 12. At opposite sides of the slot 18 and in one of its faces, the locking plate 16 also has opposing recesses 19 in which the lugs 14 of the shank 10 are engageable.

Thus, after one or more washers 15 of suitable thickness are placed upon the shank 10, the locking plate is moved thereon, receiving the shank in its opening 17 until the plate has passed downwardly opposite the recesses 12 of the shank, where the locking plate is shifted laterally to receive that portion of the shank 10 between its recesses 12, within its slot 18 so that outward movement of the locking plate will cause the lugs 14 to be received within the recesses 19 as in Fig. 2. When so engaged, it is obvious that the locking plate is prevented from again shifting laterally to pull the same from the shank 10, and in order to hold the parts in this position and bind them in their engaged relation, a wedge 20 is utilized having a head 21 at one end and provided with a longitudinal slot 22 of sufficient width to receive the shank 10 therebetween. This wedge, which has the walls upon the opposite sides of its slot 22 provided with inclined faces 23, and with points 24 of greatest thickness located intermediate their ends, is driven beneath the washer or washers 15 until the bolt 10 is at the inner end of the slot 22 of the wedge, at which time the points of greatest thickness of its side walls will have passed the plane of the axis of the shank 10 during which movement the washers 15 and locking plate 16 are forced toward the plain end of the bolt shank upon the inclined faces 23.

Thus in connecting two parts A and B as in Figs. 1, 2 and 3, the shank 10 of the bolt is passed therethrough and the wedge 20 inserted between a washer 15 of desired thickness and one of the members A and B to be connected, it being obvious that when driven firmly into the position shown, particularly in Figs. 1 and 3, with its point of greatest thickness past the axial plane of the bolt shank, the wedge 20 will tend under vibration of strain to move farther in the same direction, which movement being prevented, the parts thus remain in the desired position without danger of accidental displacement as in the case of bolts with nuts.

My invention not only provides for the safety feature above referred to, but also permits of the formation of a locking bolt, with less expense and greater facility than a bolt and nut, and also effects great saving in the time required to properly adjust a nut upon a bolt and turn the same tight thereon.

I claim:

1. A locking bolt having a shank provided with a head at one end and with intermediate side recesses and lugs at the outer ends of said recesses, a locking plate having an opening of the full diameter of the bolt shank, and a slot leading from said opening of a width equal to the width of the bolt shank between its side recesses, said locking plate also having recesses at opposite sides of its slot to receive the lugs of the bolt shank, a wedge having its point of greatest thickness intermediate its ends and having a head at one end, said wedge having a longitudinal slot extending from its opposite end and terminating short of the head to receive a shank of the bolt, and a washer interposed between the locking plate and the wedge, as described.

2. A locking bolt including a shank provided with a head at one end and having a reduced portion, a locking plate provided with an opening of the full diameter of the shank and having a slot leading from said opening to receive the reduced portion of the shank, means carried by the shank and the locking plate and engageable with one another when the reduced portion of the shank is within the slot of the locking plate, to prevent lateral shifting movement of the locking plate, a wedge having portions arranged to straddle the bolt shank and provided with a head, and a washer interposed between the wedge and the locking plate as described.

3. A locking bolt having a shank provided with a head at one end, a locking plate movable on the shank and laterally shiftable with respect thereto within limits, relatively engageable means carried by the bolt shank and the locking plate to prevent lateral movement of the latter, a wedge having a longitudinal slot forming side portions arranged to straddle the bolt shank, and disposed beneath the locking plate, the said slot of the wedge terminating short of one end thereof to prevent its movement longitudinally in one direction when engaged on the bolt shank.

4. A locking bolt comprising a bolt shank having a head at one end, a locking plate adjacent the opposite end of the bolt and detachable therefrom, relatively engageable means carried by the bolt shank and the locking plate for securing the latter with respect to the bolt shank, and a wedge member having a slot extending partially therethrough to receive the bolt shank, forming side portions straddling the shank and having their points of greatest thickness movable to one side of the plane of the axis of the shank for the purpose described.

WILLIAM HACKETT.

Witnesses:
PEARL HAND,
S. S. LAMONT.